United States Patent
Inose et al.

(10) Patent No.: US 8,759,712 B2
(45) Date of Patent: Jun. 24, 2014

(54) METHOD OF MANUFACTURING A STIFFENED PLATE BY HYBRID LASER ARC WELDING

(75) Inventors: Koutarou Inose, Yokohami (JP); Shiro Saito, Yokohama (JP); Junko Kambayashi, Yokohama (JP); Hiroto Yamaoka, Yokohama (JP); Tomohiro Sugino, Tokyo (JP); Isao Kawaguchi, Yokohama (JP)

(73) Assignee: IHI Corporation (JP)

( * ) Notice: Subject to any disclaimer, the term of this patent is extended or adjusted under 35 U.S.C. 154(b) by 279 days.

(21) Appl. No.: 13/337,770

(22) Filed: Dec. 27, 2011

(65) Prior Publication Data

US 2012/0118863 A1    May 17, 2012

Related U.S. Application Data (62) Division of application No. 12/527,074, filed as application No. PCT/JP2008/052531 on Feb. 15, 2008, now abandoned.

(30) Foreign Application Priority Data

| Feb. 15, 2007 | (JP) | ................................. | 2007-034826 |
| Apr. 4, 2007 | (JP) | ................................. | 2007-098323 |
| Jan. 30, 2008 | (JP) | ................................. | 2008-018968 |

(51) Int. Cl.
*B23K 26/24* (2014.01)
*B23K 28/02* (2014.01)
*B23K 26/06* (2014.01)

(52) U.S. Cl.
CPC .............. *B23K 26/243* (2013.01); *B23K 28/02* (2013.01); *B23K 26/0626* (2013.01)
USPC ............... 219/121.64; 219/121.61; 219/121.8

(58) Field of Classification Search
CPC ...... B23K 26/24; B23K 26/243; B23K 26/26; B23K 26/3226; B23K 2201/04; B23K 2201/045; B23K 26/0643; B23K 26/0648; B23K 26/0626; B23K 26/045; B23K 26/08; B23K 28/02
USPC ............. 219/121.64, 121.74, 121.75, 121.61, 219/121.63, 121.8
See application file for complete search history.

(56) References Cited

U.S. PATENT DOCUMENTS

| 1,867,433 A | 7/1932 | Young .......................... 52/506.1 |
| 2,217,110 A | 10/1940 | Gilpin ........................ 52/783.11 |

(Continued)

FOREIGN PATENT DOCUMENTS

| CN | 1652896 A |   | 8/2005 |
| JP | 6-000669 A | * | 6/1994 |

(Continued)

OTHER PUBLICATIONS

Machine translation of Japan Patent document No. 2006-187,794, Dec. 2003.*

(Continued)

*Primary Examiner* — Geoffrey S Evans
(74) *Attorney, Agent, or Firm* — Ostrolenk Faber LLP (57) ABSTRACT

A method of forming stiffened plate by welding a plurality of stiffener materials and a steel plate, so that closed cross-sectional structures are secured onto a surface of the steel plate. The stiffener materials are joined to the steel plate as a result of edge portions of the stiffener materials which are in contact with the steel plate by being laser welded at a predetermined welding speed as a result of a laser having a predetermined output being irradiated from a predetermined direction thereon from the external side of the closed cross-sectional structures. Accordingly, it is possible to achieve an improvement in the weld quality when welding stiffener materials onto a steel plate, and to achieve an improvement in fatigue strength.

7 Claims, 11 Drawing Sheets

(56) References Cited

U.S. PATENT DOCUMENTS

| | | | |
|---|---|---|---|
| 2,302,949 A | 11/1942 | Palmer | 52/588.1 |
| 2,746,139 A | 5/1956 | Pappelendam | 29/521 |
| 2,992,711 A | 7/1961 | Bruce et al. | 52/783.19 |
| 3,302,361 A | 2/1967 | Oudheusden, Jr. et al. | 52/783.19 |
| 3,394,514 A | 7/1968 | Lindner | 52/332 |
| 3,948,614 A | 4/1976 | Michalon | 428/116 |
| 4,414,257 A | 11/1983 | Haraga et al. | 428/182 |
| 5,007,225 A | 4/1991 | Teasdale | 52/783.17 |
| 5,635,306 A | 6/1997 | Minamida et al. | 428/593 |
| 6,779,707 B2 | 8/2004 | Dracup et al. | 228/112.1 |
| 6,848,233 B1 | 2/2005 | Haszler et al. | 52/783.17 |
| 7,740,306 B2 | 6/2010 | Ochoa | 296/186.1 |
| 2005/0211688 A1 | 9/2005 | Matile et al. | |
| 2006/0065643 A1* | 3/2006 | Hackius et al. | 219/121.64 |

FOREIGN PATENT DOCUMENTS

| | | | | |
|---|---|---|---|---|
| JP | 8-187587 A | * | 7/1996 | |
| JP | 2000-061673 A | * | 2/2000 | |
| JP | 2001-248114 A | | 9/2001 | |
| JP | 2001-276969 A | | 10/2001 | |
| JP | 2005-021912 | | 1/2005 | |
| JP | 2006-070570 | | 3/2006 | |
| JP | 2006-097283 | | 4/2006 | |
| JP | 2006-116568 | | 5/2006 | |
| JP | 2006-187794 A | * | 7/2006 | |
| JP | 2006-187794 A | | 7/2006 | |
| JP | 2006-224137 A | | 8/2006 | |
| JP | 2006-224137 A | * | 10/2006 | |

OTHER PUBLICATIONS

Machine translation of Japan Patent document No. 2006-224,137, Dec. 2003.*

Japanese Office Action and English translation dated Oct. 9, 2012 issued in corresponding Japanese Patent Application No. JP 2008-018968.

International Search Report dated Apr. 22, 2008, issued in corresponding international application No. PCT/JP2008/052531.

Kitagawa, Shoichi: "Strength Characteristics of Laser Lap Welded Joins in Medium Thickness Plates and Panel Manufacturing." Hitachi Zosen Corporation in "Laser Symposium: Applications of Laser Welding to Medium Thickness Plate Manufactured Bodies." Japan Welding Engineering Society, LMP Committee, convoked Aug. 22-23, 2002. (English Abstract available only).

Second Office Action mailed Mar. 13, 2012 in corresponding Chinese Patent Application No. 200880003166.1 (with English translation).

Office Action mailed Aug. 3, 2011 in parent U.S. Appl. No. 12/527,074.

* cited by examiner

METHOD OF MANUFACTURING A STIFFENED PLATE BY HYBRID LASER ARC WELDING

CROSS REFERENCE TO RELATED APPLICATIONS

The present application is a divisional of U.S. patent application Ser. No. 12/527,074, filed Aug. 13, 2009, which is a U.S.C. §371 National Phase conversion of PCT/JP2008/052531, filed Feb. 15, 2008, which claims benefit of Japanese Application Nos. 2007-034826, filed Feb. 15, 2007, 2007-098323, filed Apr. 4, 2007 and 2008-018968, filed Jan. 30, 2008, the contents of which are incorporated herein by reference. The PCT International Application was published in the Japanese language.

TECHNICAL FIELD

The present invention relates to a stiffened plate and to a method of manufacturing a stiffened plate.

BACKGROUND ART

Various materials such as concrete materials and the like are used as the floor material of bridges and the like. Steel floor plates are known as one of these materials. Steel floor plates are principally formed by steel plates (i.e., deck plates), however, deck plates themselves can not satisfactorily guarantee the necessary strength. Therefore, normally, steel floor plates are formed as stiffened plates which have stiffener materials (i.e., ribs) provided on their bottom surface.

These stiffener materials may be belt-shaped plate steel, or may be steel materials having a V-shaped or U-shaped cross section which are known as closed cross section ribs or the like. These stiffener materials are joined to the bottom surface of a deck plate in parallel with each other and at fixed intervals so as to form a stiffened plate.

Here, edge portions on both ends of the closed cross section ribs are joined by arc welding to the deck plate so as to form a closed cross-sectional structure with the deck plate.

A variant example of the above described type of stiffened plate is the sandwich panel shown in Non-patent document 1. This sandwich panel is manufactured by arranging a number of U-shaped rib members in parallel with each other on a deck plate so as to form a closed cross-sectional structure, and by then arc welding edge portions of the U-shaped rib members onto the deck plate. In addition, a bottom plate is placed on apex portions of the U-shaped rib members, and the apex portions of the U-shaped rib members and the bottom plate are joined together by laser welding.

Note that Patent document 1 below by the applicants of the present invention provides documentation for prior art relating to welding technologies for stiffened plates.

Non-patent document 1: "Strength Characteristics of Laser Lap Welded Joins in Medium Thickness Plates and Panel Manufacturing", by Shoichi Kitagawa, Hitachi Zosen Corporation in "Laser Symposium: Applications of Laser Welding to Medium Thickness Plate manufactured Bodies" Corporation: Japan Welding Engineering Society, LMP Committee, convoked Aug. 22 (Th) to 23 (We), 2002

Patent document 1: Japanese Unexamined Patent Application, Publication No. 2006-224137

DISCLOSURE OF THE INVENTION

Problems to be Solved by the Invention

In arc welding, since a welded metal experiences thermal contraction after welding, tensile residual stress (i.e., welding residual stress) is generated within the deck plate and closed cross section ribs. This welding residual stress causes the assembly accuracy of the components to deteriorate, giving rise to problems such as deteriorated tensile strength, compressive strength, or fatigue strength in the components.

Moreover, in the welding of the closed cross-sectional structure portion of a closed cross section rib, it is only possible to perform the welding operation from the external side of the closed cross-sectional structure portion. However, when this type of closed cross-sectional structure portion is arc welded, if an attempt is made to prevent melt-through (i.e., over-welding), the problem exists that partially unwelded portions (i.e., welding residue portions) occur in the distal end of a single bevel or single-J bevel, namely, in a root portion on the internal side of the closed cross-sectional structure. Namely, in arc welding, because it is not possible to accurately control the melt range, if an attempt is made to prevent melt-through, then welding residue portions end up being generated.

In this manner, if welding residual stress is generated within a deck plate and closed cross section ribs, and if welding residue portions are present in root portions on the internal side of the closed cross-sectional structures, then stress is concentrated in an area directly above the welding residue portions of the deck plate. Because of this, cracks are easily generated in areas directly above the welding residue portions of the deck plate. If cracks are generated in a deck plate, the problems arise that there is an abrupt drop in fatigue strength and that this might easily lead to fatigue failure. Moreover, because melt-through causes the weld quality to deteriorate, this is not preferable.

Furthermore, although the laser lap welding described in the aforementioned Non-patent document 1 in which welding is performed so as to penetrate two components in a sandwich panel is the method used for the laser welding in order to manufacture a stiffened plate, laser welding is not used conventionally for joining edge portions of the closed cross section ribs to the deck plate.

Disclosure of the Invention

The present invention was conceived in view of the above described circumstances and it is an object thereof to achieve an improvement in weld quality when welding stiffener materials onto a steel plate, and to achieve an improvement in fatigue strength.

Means for Solving the Problem

In order to achieve the above described object, a first aspect of the present invention is a stiffened plate which is formed by welding a plurality of stiffener materials which, together with a steel plate, form closed cross-sectional structures onto a surface of the steel plate, wherein the stiffener materials are joined to the steel plate as a result of edge portions of the stiffener materials which are in contact with the steel plate by being laser welded at a predetermined welding speed as a result of a laser having a predetermined output being irradiated from a predetermined direction thereon from the external side of the closed cross-sectional structures.

A second aspect of the present invention is the stiffened plate according to the first aspect, wherein the edge portions of the stiffener materials are formed so as to face the surface of the steel plate substantially parallel therewith, and are laser welded to the steel plate.

A third aspect of the present invention is the stiffened plate according to the first or second aspects, wherein the stiffener materials are closed cross section ribs which have a substantially U-shaped cross section orthogonally to the longitudinal direction.

A fourth aspect of the present invention is the stiffened plate according to any one of the first through third aspects, wherein instead of laser welding, the stiffener materials are welded to the steel plate by means of hybrid laser-arc welding in which laser welding and arc welding are performed in combination.

A fifth aspect of the present invention is a method of manufacturing a stiffened plate which is formed by welding a plurality of stiffener materials which, together with a steel plate, form closed cross-sectional structures onto a surface of the steel plate, wherein the steel plate and the stiffener materials are joined together as a result of edge portions of the stiffener materials which are in contact with the steel plate being laser welded at a predetermined welding speed as a result of a laser having a predetermined output being irradiated from a predetermined direction thereon from the external side of the closed cross-sectional structures.

A sixth aspect of the present invention is the method of manufacturing a stiffened plate according to the fifth aspect in which, prior to the laser welding, the edge portions of the stiffener materials are formed so as to face the surface of the steel plate substantially parallel therewith.

A seventh aspect of the present invention is the method of manufacturing a stiffened plate according to the fifth or sixth aspects, wherein in the laser welding, a refractive laser welding apparatus which refracts laser light which has been converged by a convex lens onto a planar mirror is used to irradiate laser light over the surface of the steel plate so as to join the stiffener materials to the steel plate.

An eighth aspect of the present invention is the method of manufacturing a stiffened plate according to any one of the fifth through seventh aspects, wherein in the laser welding, a refractive laser welding apparatus which converges and refracts laser light using a parabolic mirror or spherical mirror is used to irradiate laser light over the surface of the steel plate so as to join the stiffener materials to the steel plate.

A ninth aspect of the present invention is the method of manufacturing a stiffened plate according to any one of the fifth through seventh aspects, wherein, the welding is achieved by means of hybrid laser-arc welding in which arc welding is performed in a process either simultaneously with or consecutively to the laser welding.

A tenth aspect of the present invention is the method of manufacturing a stiffened plate according to any one of the fifth through ninth aspects, wherein in the laser welding or in the hybrid laser-arc welding, filler wire is used.

An eleventh aspect of the present invention is the method of manufacturing a stiffened plate according to any one of the fifth through tenth aspects, wherein in the laser welding or in the hybrid laser-arc welding, a bevel shape in which there is no gap with the skin plate is used.

A twelfth aspect of the present invention is the method of manufacturing a stiffened plate according to any one of the fifth through eleventh aspects, wherein in the laser welding or in the hybrid laser-arc welding, the skin plate is used in a structure having a curved surface.

Effect of the Invention

According to the present invention, because edge portions of stiffener materials are joined to a steel plate by laser welding or by hybrid laser-arc welding, for example, by appropriately setting the laser output, the irradiation direction, and the welding speed, it is possible to eliminate the occurrence of melt-through and welding residue portions. Accordingly, it is possible to achieve an improvement in the weld quality when welding stiffener materials onto a steel plate, and to achieve an improvement in fatigue strength.

DESCRIPTION OF THE REFERENCE NUMERALS

10 Deck plate
20 Closed cross section rib
20 Rib
21 Edge portion
22 Edge portion
30 Laser welding apparatus
31 Light source
32 Convex lens
33 Planar mirror
34 Laser emission port
35 Housing
40 Laser welding apparatus
41 Light source
43 Curved mirror
44 Laser emission port
45 Housing a: arrow
L Laser
M Torch
t1 Predetermined plate thickness
t2 Predetermined plate thickness
W Filler wire
X Distance from head
Y Welding direction
θ Irradiation angle

BEST MODE FOR CARRYING OUT THE INVENTION

Figure 1:
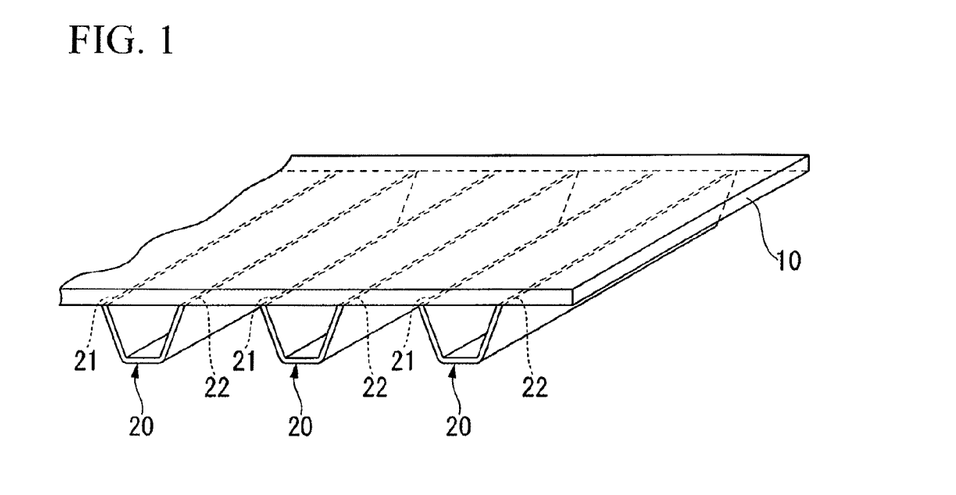
FIG. 1 is a perspective view showing the structure of a stiffened plate in an embodiment of the present invention.
Figure 2:
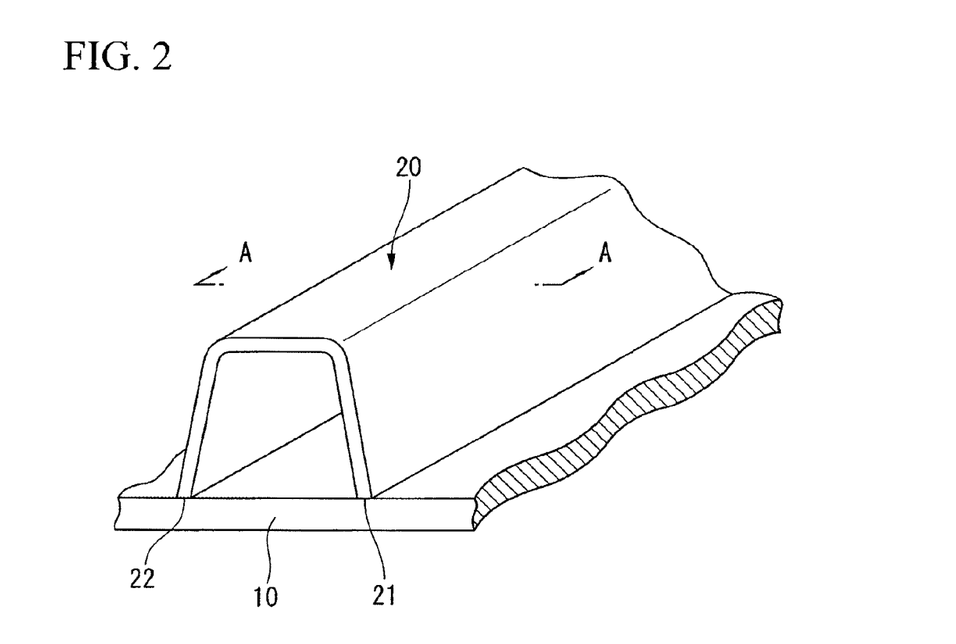
FIG. 2 is a perspective view showing a portion of the stiffened plate shown in FIG. 1 which has been enlarged and vertically inverted.
Figure 3:
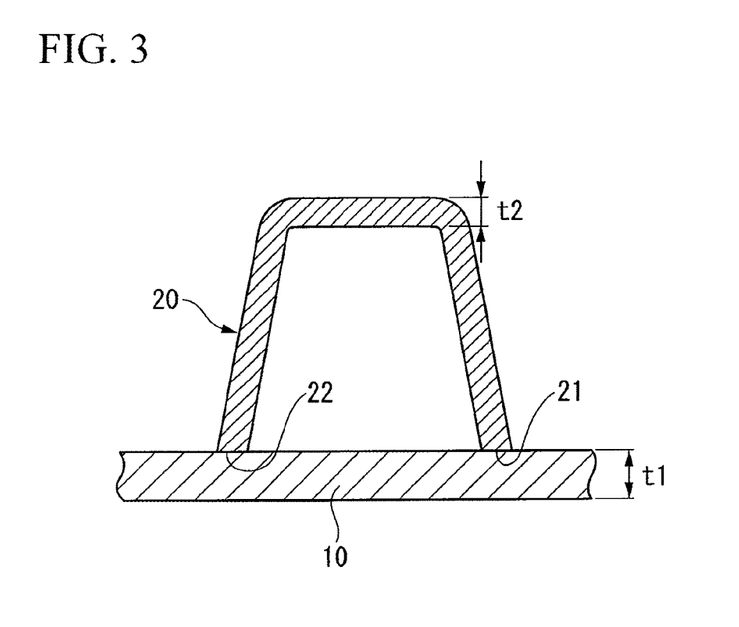
FIG. 3 is a cross-sectional view taken along a line A-A in FIG. 2.

Hereinafter, an embodiment of the present invention will be described with reference made to the drawings. Firstly, FIG. 1 is a perspective view showing the structure of a stiffened plate in the present embodiment. FIG. 2 is a perspective view showing a portion of the stiffened plate shown in FIG. 1 which has been enlarged and vertically inverted. FIG. 3 is a cross-sectional view taken along a line A-A in FIG. 2.

Note that stiffened plates are used in a variety of applications such as the decking and structural components of ships and the like, however, here, an example is described in which stiffened plates are used, for example, for the steel floor plates of a bridge.

Steel floor plates (i.e., stiffened plates) are formed by placing a plurality of closed cross section ribs 20 (i.e., stiffener materials) at fixed intervals on one surface of a deck plate 10 (i.e., a steel plate). The deck plate 10 is a flat plate made from steel having a predetermined thickness of t1 (for example, 12 mm). The closed cross section ribs 20 are made of shape steel having a U-shaped cross-section and are formed by bending a flat plate made from steel having a predetermined thickness of t2 (for example, 6 to 8 mm).

Figure 4:
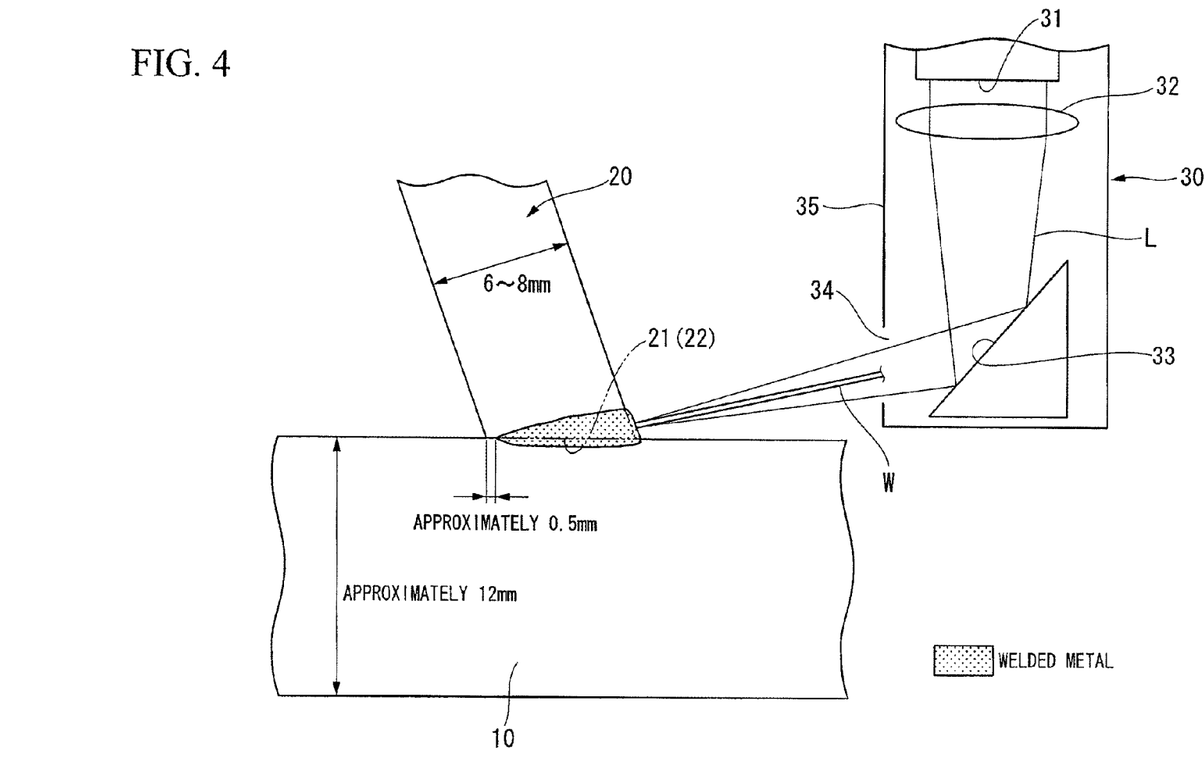
FIG. 4 is a typical view showing the structure of a refractive laser welding apparatus which is used for the laser welding in an embodiment of the present invention, and also shows a state in which this refractive laser welding apparatus is in use.

FIG. 4 is a typical view showing the structure of a laser welding apparatus 30 (i.e., a refractive laser welding apparatus), and also shows a state in which the laser welding apparatus 30 is in use. As shown in this drawing, the laser welding apparatus 30 has a light source 31, a convex lens 32, a planar mirror 33, and a housing 35 which houses the components 31 through 33 and in which is formed a laser emission port 34. The light source 31 emits a laser L. The convex lens 32 converges the laser L. The planar mirror 33 reflects the laser L.

Figure 5:
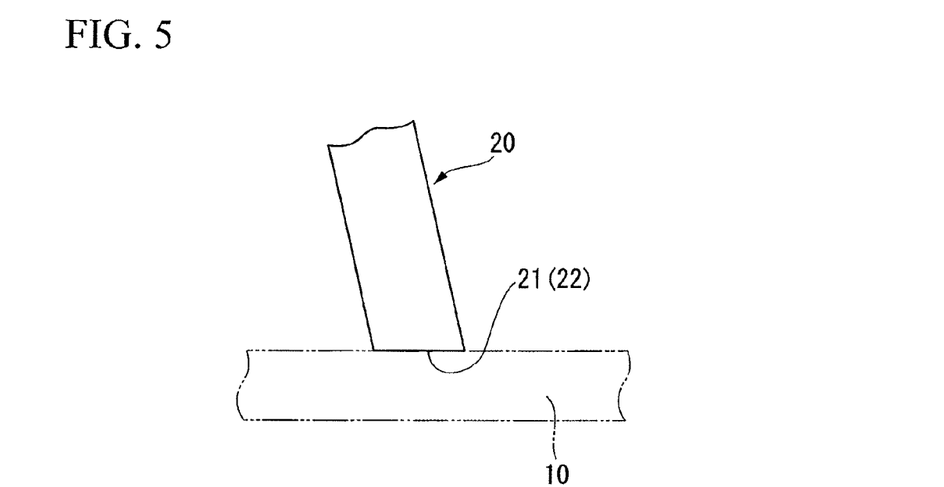
FIG. 5 is a typical view showing a configuration of an edge portion of a closed cross section rib in an embodiment of the present invention.
Figure 6:
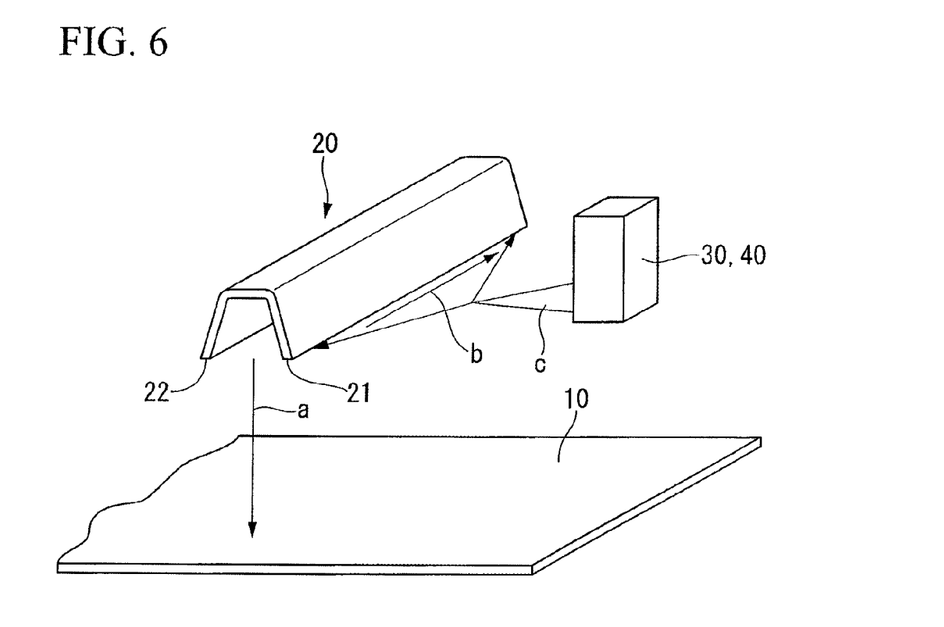
FIG. 6 is an explanatory view showing a manufacturing process for a steel floor plate in an embodiment of the present invention.

FIG. 5 is a typical view showing the shape of a pair of edge portions 21 and 22 of a closed cross section rib 20. FIG. 6 is an explanatory view showing a process to manufacture a steel floor plate. A description will now be given in detail of a process to manufacture a steel floor plate with reference made to these drawings.

Firstly, as is shown in FIG. 5, the pair of edge portions 21 and 22 of the closed cross section rib 20 are formed at an angle which enables them to face the surface of the deck plate 10 against which they are abutted substantially parallel therewith. The pair of edge portions 21 and 22 of the closed cross section rib 20 are then abutted on the surface of the deck plate 10 (see the arrow a in FIG. 6).

Next, the laser welding apparatus 30 irradiates a laser (see c in FIG. 6) over the entire length of the closed cross section rib 20 (see the arrow b in FIG. 6) from the external side of the closed cross sectional structure which is formed by the deck plate 10 and the closed cross section rib 20. As a result, the respective edge portions 21 and 22 of the closed cross section rib 20 are laser welded to the surface of the deck plate. As a result of laser welding being performed on the two edge portions 21 and 22 of the closed cross section rib 20, the closed cross section rib 20 is joined to the deck plate 10 and a steel floor plate is thereby produced.

As shown in FIG. 4, the laser welding apparatus 30 converges the laser L emitted by the light source 31 by means of the convex lens 32, and then reflects the laser L which has been converged by the convex lens 32 by means of the planar mirror 33 so as to refract the direction of travel of the laser L. The laser welding apparatus 30 then emits the laser L through the laser emission port 34. The laser L which has been emitted by the laser welding apparatus 30 is irradiated onto the deck plate 10 adjacent to the edge portions 21 and 22 of the closed cross section rib 20. As a result, the closed cross section rib 20 is joined to the deck plate 10. Note that, if necessary, it is possible to supply a wire W to the vicinity of the edge portions 21 and 22 of the closed cross section rib 20 together with the laser L.

When laser welding is being performed by the laser welding apparatus 30, the output of the laser L, the irradiation position, the irradiation direction, the welding speed, and the supply speed of the wire W are appropriately set. As a result, it is possible to prevent the occurrence of melt-through, and to reduce welding residue portions to approximately 0.5 mm.

Moreover, by using the laser welding apparatus 30 which is a refractive laser welding apparatus, it is possible to freely refract the laser L to a desired angle (for example, approximately 90°), and then irradiate it across the surface of the deck plate 10. Herewith, it is possible to irradiate easily the laser L onto the deck plate 10 adjacent to the edge portions 21 and 22 of the closed cross section rib 20.

Furthermore, since the weld of the present embodiment is not achieved by arc welding, there are no effects from welding residual stress which is caused by thermal contraction of the welded metal after arc welding has ended. Accordingly, there is no reduction in the assembly accuracy of the components, and no reduction in the tensile strength, the compression strength, or the fatigue strength of the components due to the effects of welding residual stress.

In addition, if, as in the present embodiment, the closed cross section ribs 20 are welded onto the deck plate 10 without welding residual stress being generated and with only a minimal amount of welding residue portions, then stress concentration in the welding residue portions is decreased. As a result, it is possible to reduce the extent to which cracks are generated in an area directly above welding residue portions in the deck plate 10. Accordingly, according to the present embodiment, it is possible to eliminate the occurrence of melt-through when welding the edge portions 21 and 22 of a closed cross section rib 20 onto the deck plate 10, and to achieve an improvement in the weld quality by reducing welding residue portions to an absolute minimum. In addition to this, it is possible to suppress the occurrence of cracks in the deck plate 10 and thereby improve the fatigue strength.

Figure 7:
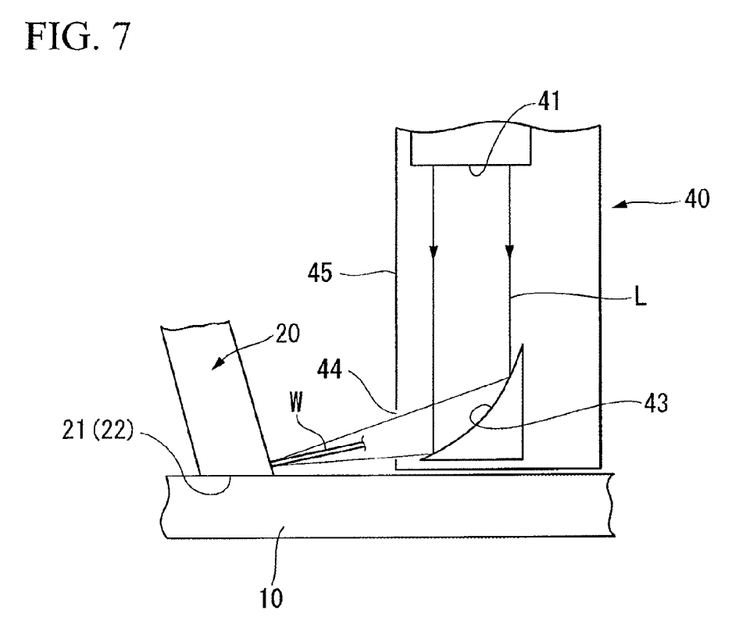
FIG. 7 is a typical view showing the structure of a refractive laser welding apparatus which is used in another embodiment of the present invention, and also shows a state in which this refractive laser welding apparatus is in use.
Figure 8A:
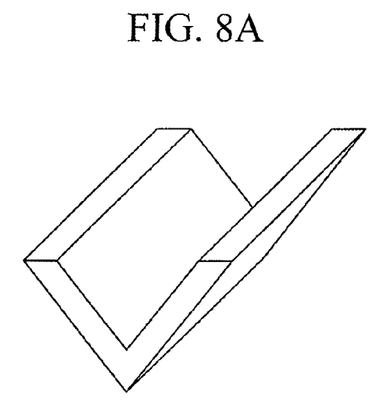
FIG. 8A is a perspective view showing an outer appearance of a closed cross section rib in another embodiment of the present invention.
Figure 8B:
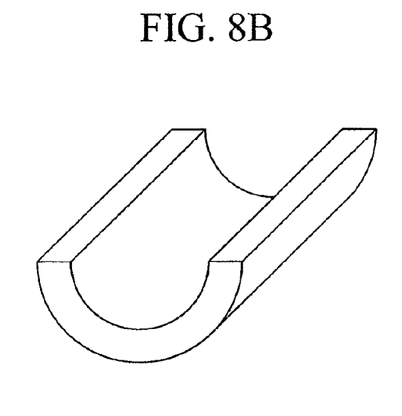
FIG. 8B is a perspective view showing an outer appearance of a closed cross section rib in another embodiment of the present invention.
Figure 8C:
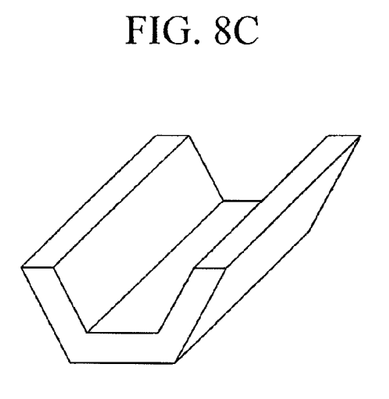
FIG. 8C is a perspective view showing an outer appearance of a closed cross section rib in another embodiment of the present invention.
Figure 8D:
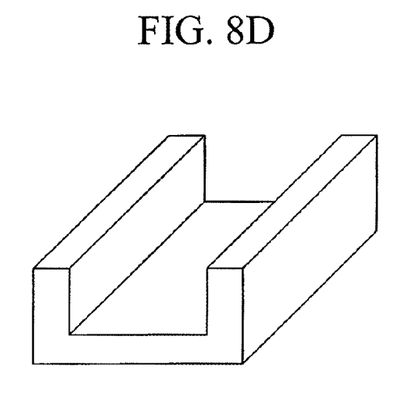
FIG. 8D is a perspective view showing an outer appearance of a closed cross section rib in another embodiment of the present invention.

Note that in the above described embodiment the laser welding apparatus 30 shown in FIG. 6 has been used, however, when implementing the present invention, it is also possible to use the laser welding apparatus 40 (i.e., a refractive laser welding apparatus) shown in FIG. 7. The laser welding apparatus 40 has a light source 41, a curved mirror 43 having a paraboloidal or spherical reflective surface, and a housing 45 which houses the portions 41 and 43 and in which a laser emission port 44 is formed.

This laser welding apparatus 40 causes a laser L which has been emitted by the light source 41 to be converged and reflected by the curved mirror 43, and is thus able to refract the direction of travel of the laser L. The laser L is then emitted from the laser emission port 44.

Moreover, in the above described embodiment, shaped steel having a U-shaped cross-section is used for the closed cross section ribs 20. However, when implementing the present invention, it is also possible for the closed cross section ribs to have a cross section of another shape such as a V-shaped cross section, a semicircular cross section, a trapezoidal cross section, or a quadrangular cross section such as those shown in FIG. 8. Furthermore, in the above described embodiment, the stiffener materials were provided by the closed cross section ribs 20. However, when implementing the present invention, it is not essential for a closed cross-sectional structure to be formed together with the deck plate 10, and for example, even when I-steel or the like is joined to the deck plate 10, the present invention can be applied with superior results.

In addition, in the above described embodiment, a description is given in which steel plate is used for the deck plate 10 and in which a steel floor plate is used as an example of a stiffened plate. However, when implementing the present invention, the steel plate is not limited to being the deck plate 10 and the stiffened plate is not limited to being a steel floor plate. If it is provided that the stiffened plate is formed by arranging stiffener materials on a steel plate, then the present invention can be applied with superior results.

Next, a description will be given using FIG. 9 through FIG. 11B of a case in which the welding is achieved by means of hybrid laser-arc welding in which arc welding is performed in a process either simultaneously with or consecutively to the laser welding. As described below, in a hybrid laser-arc welding apparatus, a laser L and an arc welding torch M target substantially the same spot. Note that, in the drawings, the same functional portions are given the same descriptive symbols and any duplicated description thereof is avoided.

Figure 9A:
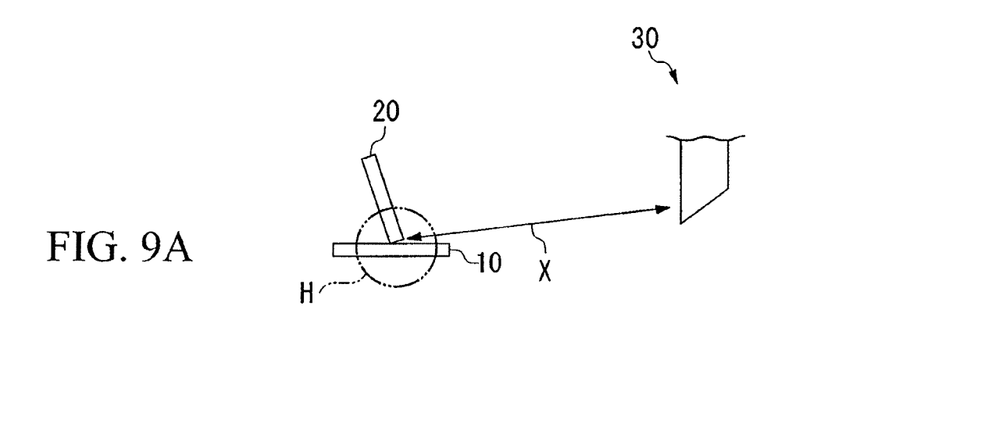
FIG. 9A is a cross-sectional view illustrating hybrid laser-arc welding in another embodiment of the present invention.
Figure 9B:
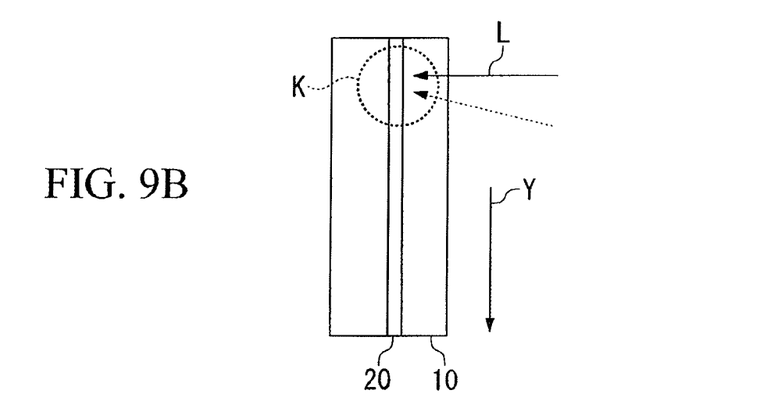
FIG. 9B is a plan view illustrating hybrid laser-arc welding in another embodiment of the present invention.

FIG. 9 is an explanatory view showing hybrid laser-arc welding in another embodiment of the present invention with (*a*) being a cross-sectional view thereof and (*b*) being a plan view thereof. As shown in FIG. 9 (*a*) and FIG. 9 (*b*), when joining a closed cross section rib (may also be referred to below simply as a 'rib' or 'stiffened plate') 20 to a deck plate (may also be referred to below simply as a 'skin plate' or 'steel material') 10 by means of hybrid laser-arc welding, the laser L is irradiated with a distance of X from a head of the laser welding apparatus 30 onto a weld spot. While an arc welding torch is then applied to a position close to this irradiated portion, hybrid laser-arc welding is then performed in a welding direction Y at a predetermined welding speed. Note that it is possible for either the laser welding or the arc welding to be given precedence.

Figure 10:
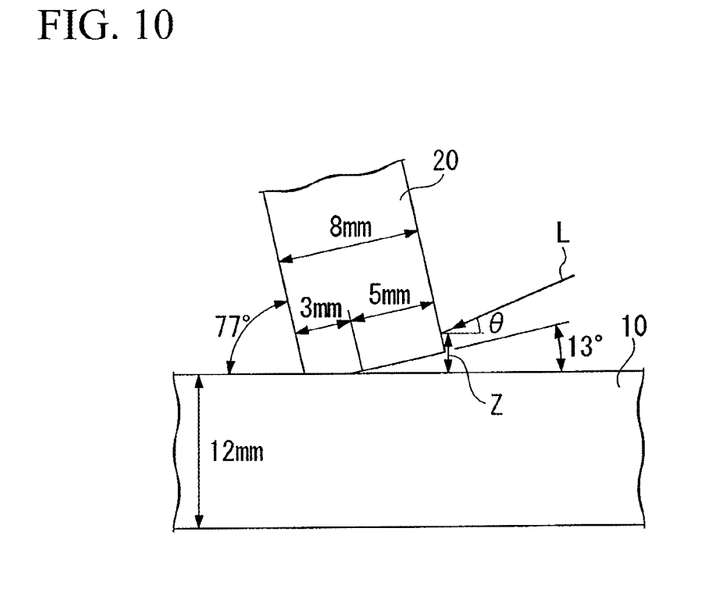
FIG. 10 is an explanatory view illustrating hybrid laser-arc welding in another embodiment of the present invention, and is an enlargement of a principal portion of FIG. 9A.

FIG. 10 is an explanatory view showing hybrid laser-arc welding in another embodiment of the present invention, and is an enlarged view of a principal portion H in FIG. 9A. As shown in FIG. 10, it is preferable for the irradiation angle θ of the laser L to be not less than 10 degrees. It is also preferable for the Z target position to be set somewhat low (for example, 5 mm or less).

When the predetermined output is less than 4 kW, it is difficult for melt-through to occur but easy for welding residue to be generated so that the welding quality required from the present system cannot be achieved. Moreover, if the predetermined output is greater than 10 kW, since the output is large relative to the rib thickness of the steel floor plate, there is a concern that melt-through will be generated.

On the other hand, when the predetermined welding speed is less than 50 cm/min, the advantage of laser welding that is fast welding speeds is lost. However, if the predetermined welding speed is greater than 200 cm/min, there is a concern that welding residue will be generated.

Figure 11A:
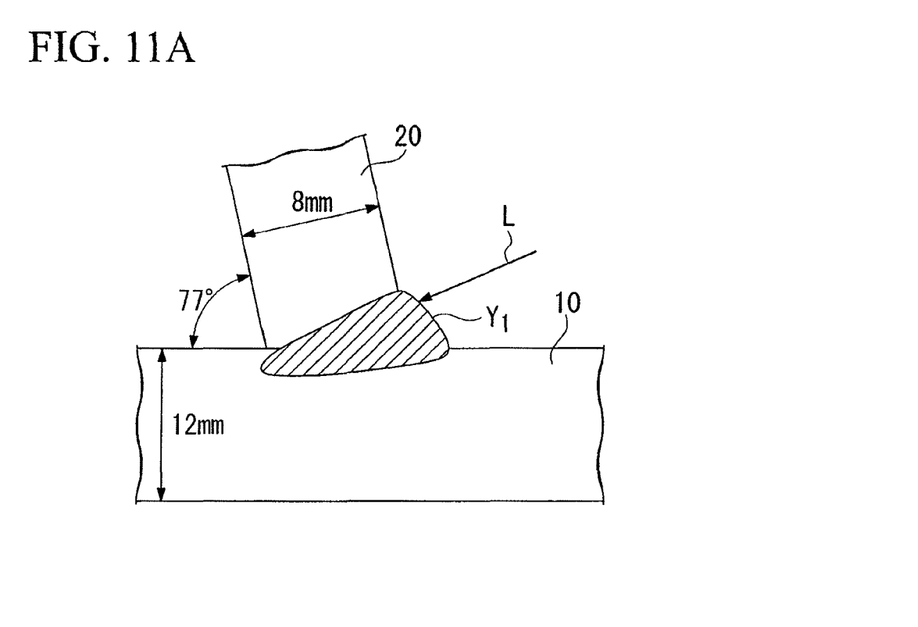
FIG. 11A shows a state of a melt portion which corresponds to an irradiation angle θ of a laser L in FIG. 10, and shows a case in which the irradiation angle θ of the laser L is not less than 10°.
Figure 11B:
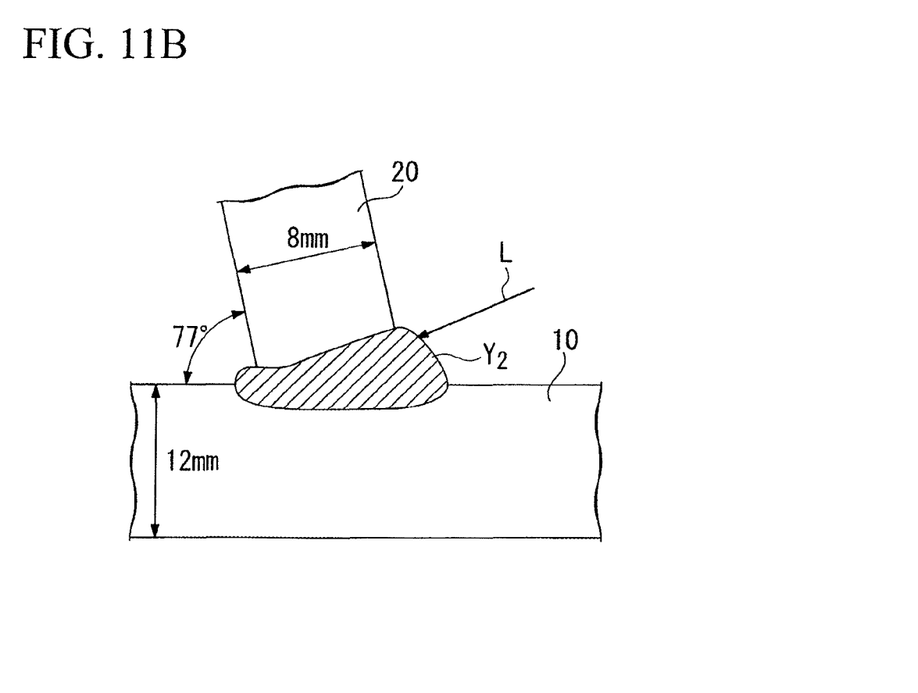
FIG. 11B shows a state of a melt portion which corresponds to an irradiation angle θ of a laser L in FIG. 10, and shows a case in which the irradiation angle θ of the laser L is less than 10°.

FIG. 11A shows a state of a melt portion which corresponds to the aforementioned irradiation angle θ, and shows a melt portion Y1 when the irradiation angle θ of the laser L is not less than 10°. FIG. 11B shows a melt portion Y2 when the irradiation angle θ of the laser L is less than 10°. Melt-through is not generated in the melt portion Y1 in which the irradiation angle θ of the laser L is 10° or more, however, melt-through is generated in the melt portion Y2 in which the irradiation angle θ of the laser L is less than 10°. When the irradiation angle θ of the laser L is 10° or greater, as shown in the drawing, since the distal end of the weld penetration is inside the deck plate 10, it is difficult for melt-through to be generated. However, when the irradiation angle θ of the laser L is less than 10°, since the distal end of the weld penetration is positioned between the deck plate 10 and the rib 20, it is easy for melt-through to be generated.

Figure 12A:
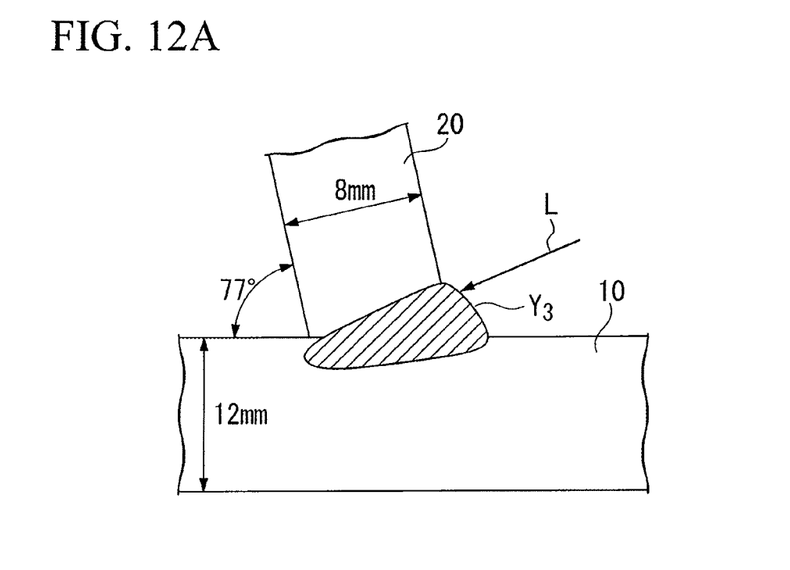
FIG. 12A shows a state of a melt portion in FIG. 10 when a Z target position is not more than 5 mm (i.e., low).
Figure 12B:
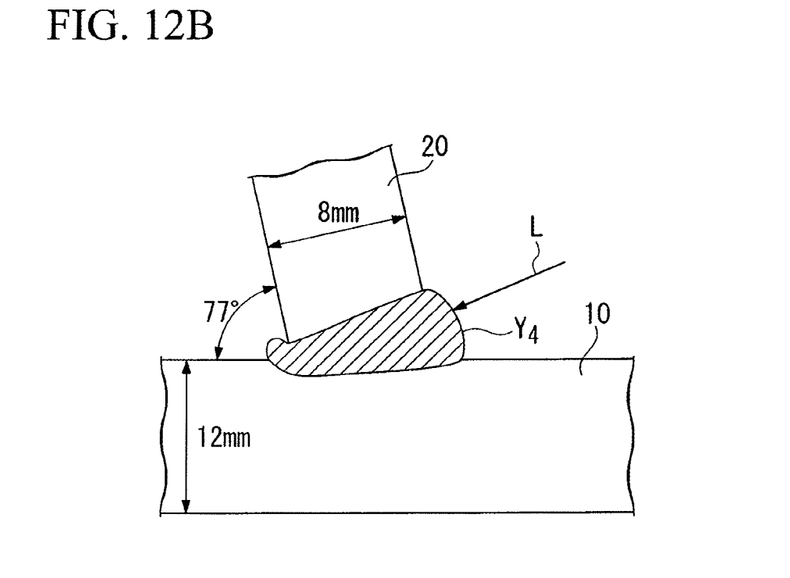
FIG. 12B shows a state of a melt portion in FIG. 10 when a Z target position is greater than 5 mm (i.e., high).

FIG. 12A and FIG. 12B show states of a melt portion corresponding to the aforementioned Z target position. FIG. 12A shows a melt portion Y3 in which the Z target position is 5 mm or less (i.e., low), while FIG. 12B shows a melt portion Y4 in which the Z target position is greater than 5 mm (i.e., high). In the melt portion Y3 in which the Z target position has been set low, melt-through is not generated, however, in the melt portion Y4 in which the Z target position has been set high, melt-through is generated. When the Z target position has been set low, as shown in the drawing, since the distal end of the weld penetration is inside the deck plate 10, it is difficult for melt-through to be generated, however, when the Z target position has been set high, because the distal end of the weld penetration is positioned between the deck plate 10 and the rib 20, it is easy for melt-through to be generated.

Figure 13:
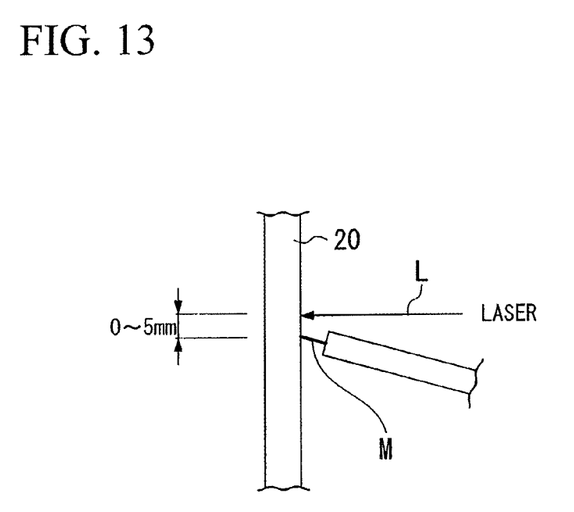
FIG. 13 is an explanatory view illustrating hybrid laser-arc welding in another embodiment of the present invention, and is an enlargement of a principal portion of FIG. 9B.

FIG. 13 is an explanatory view showing hybrid laser-arc welding in another embodiment of the present invention, and is an enlarged view of a principal portion K in FIG. 9B. As shown in FIG. 11A and FIG. 11B, in a hybrid laser-arc welding apparatus, the laser L and the arc welding torch M as a rule aim for substantially the same spot, however, preferably, the welds of the laser L and the arc welding torch M are at a distance of 0 to 5 mm from each other. By using this hybrid laser-arc welding, the following two advantages are obtained.

The first advantage is that hybrid laser-arc welding makes it possible to fill the gap between the rib 20 and the deck plate 10. The gap margins at this time are as follows.

(a) In laser welding, if there is no filler wire W, this gap margin is limited to approximately 0.5 mm.

(b) In laser welding, if there is filler wire W, this gap margin is limited to approximately 1 mm.

(c) In hybrid laser-arc welding, the gap may be as much as 3 mm.

The second advantage is that, compared with when only laser welding is used, because there is also heat input from the arc welding, rapid heating and rapid cooling can be avoided. Because of this, the hardness of the welding metal is less than when laser welding (i.e., using filler wire W) is used.

Moreover, in electronic beam welding and laser welding, fundamentally, a join is achieved by only welding the base materials without adding any welding material, however, in cases such as those described below, it is preferable to add welding material (referred to below as 'filler wire' or 'wire') W.

(a) When there is a gap in the weld portion in a piece of work and it is necessary to provide a supplementary material in order to achieve consistent bead formation.

(b) When it is necessary to improve the cleanliness and mechanical properties of a weld metal.

(c) When weld reinforcement is being formed in a material whose nature is such that surface beads are easily hollowed out therein (such as aluminum alloy and the like) when performing complete-melt welding.

Moreover, in laser welding, the greatest advantage in using the filler wire W is that it is possible to fill the gap between the stiffened plate (i.e., rib) 20 and the steel plate (i.e., skin plate or deck plate) 10. Note that the present invention can also be applied to a deck plate 10 having a curved surface structure (not shown). It is also possible for the present invention to be applied to a bevel shape in which there is no gap with the deck plate 10 (see FIG. 5 and FIG. 7).

In addition, the method which is most commonly used to add a welding material in laser welding is to gradually feed out the filler wire W, as partially shown in FIG. 7. Because both an electron beam and a laser beam which are converged on a weld portion have extremely small diameters, it is common that a wire having a narrow diameter of 1 mm or less is used for the wire W. This filler wire W is fed precisely via a wire guide (not shown) to the beam irradiation point where it is then melted.

Note that the present invention can be applied to a wide range of cross-sectional shapes for the ribs 20 such as U-shapes and circular shapes and the like.

What is claimed is:

1. A method of manufacturing a stiffened plate which is formed by welding a plurality of stiffener materials which, together with a steel plate, form closed cross-sectional structures onto a surface of the steel plate, the method comprising:
    welding edge portions of the stiffener materials which are in contact with the steel plate at a welding speed of at least 50 cm/min and of at most 200 cm/min while irradiating the edge portions of the stiffener materials with a laser having an output of at least 4 kW and of at most 10 kW in a predetermined direction from the external side of the closed cross-sectional structures to provide laser welding to the edge portions of the stiffener materials; and
    welding the edge portions of the stiffener materials with arc welding performed simultaneously with the laser welding to provide hybrid laser-arc welding to the edge portions of the stiffener materials,
    wherein the edge portions of the stiffener materials are welded via the hybrid laser-arc welding to join the steel plate and the stiffener materials.

2. The method of manufacturing a steel plate according to claim 1, wherein, prior to the laser welding, the edge portions of the stiffener materials are formed so as to face the surface of the steel plate substantially parallel therewith.

3. The method of manufacturing a steel plate according to claim 1, wherein the laser welding comprises:
    irradiating laser light, by a refractive laser welding apparatus which refracts laser light which has been converged by a convex lens onto a planar mirror, over the surface of the steel plate so as to join the stiffener materials to the steel plate.

4. The method of manufacturing a steel plate according to claim 1, wherein the laser welding comprises:
    irradiating laser light, by a refractive laser welding apparatus which converges and refracts laser light by using a parabolic mirror or spherical mirror, over the surface of the steel plate so as to join the stiffener materials to the steel plate.

5. The method of manufacturing a steel plate according to claim 1, wherein, in the hybrid laser-arc welding, filler wire is used.

6. The method of manufacturing a steel plate according to claim 1, wherein, in the hybrid laser-arc welding, a bevel shape in which there is no gap with the steel plate is used.

7. The method of manufacturing a steel plate according to claim 1, wherein, in the hybrid laser-arc welding, the skin steel plate is used in a structure having a curved surface.

\* \* \* \* \*